United States Patent
Li et al.

(10) Patent No.: US 12,541,999 B2
(45) Date of Patent: Feb. 3, 2026

(54) METHOD FOR EMOTION RECOGNITION BASED ON HUMAN-OBJECT TIME-SPACE INTERACTION BEHAVIOR

(71) Applicant: SOUTHEAST UNIVERSITY, Nanjing (CN)

(72) Inventors: Xinde Li, Nanjing (CN); Chuanfei Hu, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 282 days.

(21) Appl. No.: 18/244,225

(22) Filed: Sep. 9, 2023

(65) Prior Publication Data

US 2024/0037992 A1 Feb. 1, 2024

Related U.S. Application Data

(63) Continuation of application No. PCT/CN2023/093128, filed on May 10, 2023.

(30) Foreign Application Priority Data

May 26, 2022 (CN) .......................... 202210583163.1

(51) Int. Cl.
*G06V 40/20* (2022.01)
*G06T 7/73* (2017.01)
(Continued)

(52) U.S. Cl.
CPC ................ *G06V 40/20* (2022.01); *G06T 7/74* (2017.01); *G06V 10/774* (2022.01);
(Continued)

(58) Field of Classification Search
CPC .... G06V 40/20; G06V 10/774; G06V 10/776; G06V 10/80; G06V 10/806; G06V 20/40;
(Continued)

(56) References Cited

U.S. PATENT DOCUMENTS

| | | | |
|---|---|---|---|
| 8,209,182 B2 * | 6/2012 | Narayanan | G06V 40/20 704/211 |
| 10,217,023 B1 * | 2/2019 | Rubin | G06N 3/042 |

(Continued)

FOREIGN PATENT DOCUMENTS

| | | | | |
|---|---|---|---|---|
| CN | 110313923 A | * | 10/2019 | G16H 50/30 |
| CN | 113947702 A | * | 1/2022 | G06N 3/048 |

*Primary Examiner* — Stephen R Koziol
*Assistant Examiner* — Benedict E Lee
(74) *Attorney, Agent, or Firm* — CBM PATENT CONSULTING, LLC

(57) ABSTRACT

An emotion recognition method includes the following steps: acquiring video data of a human-object interaction behavior process; performing data labeling on the positions of a person and an object and the interaction behaviors and emotions expressed by the person; constructing a feature extraction model based on deep learning, extracting features of interaction between the person and the object in a time-space dimension, and detecting the position and category of the human-object interaction behavior; mapping the detected interaction behavior category into a vector form through a word vector model; and finally, constructing a fusion model based on deep learning, fusing the interaction behavior vector and the time-space interaction behavior features, and identifying the emotion expressed by the interaction person.

8 Claims, 2 Drawing Sheets

(51) Int. Cl.
*G06V 10/774* (2022.01)
*G06V 10/776* (2022.01)
*G06V 10/80* (2022.01)
*G06V 20/40* (2022.01)
*G06V 20/70* (2022.01)

(52) U.S. Cl.
CPC .......... *G06V 10/776* (2022.01); *G06V 10/806* (2022.01); *G06V 20/41* (2022.01); *G06V 20/46* (2022.01); *G06V 20/70* (2022.01); *G06T 2207/10016* (2013.01); *G06T 2207/30196* (2013.01)

(58) Field of Classification Search
CPC ........ G06V 20/41; G06V 20/46; G06V 20/70; G06V 10/44; G06V 10/75; G06V 10/764; G06V 10/98; G06V 10/987; G06V 10/82; G06T 7/74; G06T 2207/10016; G06T 2207/30196; Y02D 10/00; G06F 18/241; G06F 18/2415; G06N 3/045; G06N 3/047; G06N 3/08
See application file for complete search history.

(56) References Cited

U.S. PATENT DOCUMENTS

| | | | |
|---|---|---|---|
| 11,941,870 B1* | 3/2024 | Kwon | G06V 20/58 |
| 12,167,100 B2* | 12/2024 | Lin | H04N 21/4666 |
| 2015/0326832 A1* | 11/2015 | Zhang | H04N 23/61 |
| | | | 348/159 |
| 2018/0181802 A1* | 6/2018 | Chen | G06V 10/454 |
| 2019/0035431 A1* | 1/2019 | Attorre | G10L 25/30 |
| 2019/0286892 A1* | 9/2019 | Li | G06N 3/045 |

* cited by examiner

METHOD FOR EMOTION RECOGNITION BASED ON HUMAN-OBJECT TIME-SPACE INTERACTION BEHAVIOR

CROSS-REFERENCE TO RELATED APPLICATIONS

This application is the U.S. continuation application of International Application No. PCT/CN2023/093128 filed on 10 May 2023 which designated the U.S. and claims priority to Chinese Application No. CN202210583163.1 filed on 26 May 2022, the entire contents of each of which are hereby incorporated by reference.

TECHNICAL FIELD

The present invention relates to the fields of computer vision and pattern recognition, in particular to a method for emotion recognition based on a human-object time-space interaction behavior.

BACKGROUND ART

With the development of artificial intelligence (AI) technology, endowing machines with the capability to understand human emotions has gradually become a research hotspot, which greatly extends the application of intelligent devices in various fields of human society. For example, an intelligent device delivering guidance services, through the observation, recognition, and understanding of an inquirer's words and deeds, is capable to judge the real emotion of the inquirer and further realize the natural, vivid, and friendly guiding interaction with the inquirer like a human being, so that the inquirer can feel that the intelligent device behaves in a natural, smooth, and warm manner. Therefore, development of targeted emotion recognition technology is of great practical significance for advancing the intellectualization and humanization of machines.

According to the existing emotion recognition methods, facial images, voice data, and physiological signals of the target are usually collected to construct an emotion recognition model. However, reliability of an emotion recognition method based on the above data sources is usually limited by the subjectivity of the target and the reliability of the acquisition mode. Specifically, facial images and voices are usually considered as intuitive cues of human emotions. However, in some special circumstances, human beings usually have the psychology of conformity and camouflage, which confuses the emotion recognition method based on subjective facial or voice modeling, and results in a deviation in recognition of the real emotion of the target. In contrast, physiological signals, such as heart rate, respiration rate, galvanic skin and EEG signals, are generally objective cues that are less susceptible to subjective camouflage by the target. However, physiological signals are acquired mostly through contact sensors, resulting in that the target will feel invaded, and the physiological signals are mixed with uncertain non-emotional factors. In addition, acquisition through the contact sensors greatly narrows the application range of emotion recognition methods.

To sum up, emotion recognition results obtained through the existing emotion recognition methods are inaccurate because the data source used for modeling is affected by the subjectivity of the target and the unreliable acquisition mode.

SUMMARY

An objective of the present invention is to provide a method for emotion recognition based on a human-object time-space interaction behavior in order to mitigate the impact of data factors on emotion recognition results and improve the accuracy of emotion recognition results. The inevitable interaction between people and objects in daily life is used as a data source to construct a more accurate and reliable emotion recognition method.

To achieve the above objective, the present invention provides the following technical solution:
a method for emotion recognition based on a human-object time-space interaction behavior, specifically including the following steps:
S1: acquiring video data of a human-object interaction behavior process;
S2: performing data labeling on the positions of a person and an object and the interaction behaviors and emotions expressed by the person;
S3: constructing a feature extraction model based on deep learning, extracting features of
interaction between the person and the object in a time-space dimension, and detecting the position and category of the human-object interaction behavior;
S4: mapping the detected interaction behavior category into a vector form through a word vector model; and
S5: constructing a fusion model based on deep learning, fusing the interaction behavior vector and the time-space interaction behavior features, and identifying the emotion expressed by the interaction person. In this technical solution, the human-object time-space interaction behavior is used as the data basis for emotion recognition for the first time, which mitigates the impact of the subjectivity of the target and the unreliable acquisition mode on the data source used by the existing emotion recognition method. Secondly, not only a human-object interaction video is used to directly establish a recognition model, but also the process of human-object interaction detection (S3, S4) is introduced, and the features of human-object interaction and the vectorized detection results are fused (S5), to perform emotion recognition on the basis of feature-level and semantic-level fusion, thus making the recognition results more interpretable.

Preferably, acquisition scenes of the video data in the S1 include the bedrooms, kitchens, bathrooms, and study rooms of residential houses, as well as inquiry desks of shopping malls and ticket offices; the interaction behavior refers to the use of objects by people, including drinking water in a cup, flipping through books, answering phone calls, operating TV remotes, operating computers, flipping sheets, brushing teeth, washing face with towels, pushing/closing doors, pushing shopping carts, and holding queuing railings. The behaviors listed here include representative human-object interaction behaviors that contain emotions in daily life, work, personal cleaning, etc. The advantage of this setting is that it is universal.

Preferably, the data labeling in the S2 involves three stages. First, a target detection network is used to generate initial positions of a person and an object in the video data and a category of the object, then the generated initial positions and category are manually corrected and inaccurate detection results are corrected to obtain accurate information of the positions and the category, and finally the interaction behavior and emotions expressed by the person in the video data are marked; the position of the person or the object refers to the smallest rectangular frame parallel to a video image containing the person or the object, and is represented by the coordinates of the center of the rectangle and the length and width; the labeling of the interaction behavior refers to marking the interaction category and the positions of the corresponding person and object; the emotions include happiness, frustration, anxiety, anger, surprise, fear, excitement, and neutrality; and the neutrality refers to no apparent emotional outpouring. Three stages of the data labeling process are explained in this technical solution, and the three stages can be considered as the dataset creation process of a method for emotion recognition based on a human-object interaction behavior. The advantage lies in that on the basis of automatic detection of the algorithm in the first stage, and in combination with the manual correction and the labeling in the second and third stages, a semi-automatic data labeling process is formed, which improves the creation efficiency of the dataset.

Preferably, the fine-tuning refers to freezing most of the learnable parameters of the network on the basis of pre-training on the general dataset, and retraining only the last two layers of the network in terms of the training data.

Preferably, the time-space dimension in the S3 refers to a three-dimensional tensor with a fixed time length, including one time dimension and two spatial dimensions; and the time length is defined by the number of video frames.

Preferably, the fusion interaction behavior vector in the S5 refers to the interaction behavior in the form of a vector in the S4.

Preferably, the time-space interaction behavior feature in the S5 refers to the interaction behavior feature of the person and the object in the time-space dimension in the S3.

Preferably, identifying the emotions expressed by the interaction person in the S5 is to classify the fusion features outputted by the fusion model. As a result, it takes full advantage of the large data volume of the general dataset, and reduces the training time of the feature extraction model on the human-object interaction detection.

Compared with the prior art, the present invention has the following beneficial effects:
1) Regarding the selection of the data source, the present invention adopts the human-object time-space behavior as a modeling basis of the emotion recognition method. The data of human-object interaction behaviors are objective and easily acquired, thus mitigating the impact of the subjectivity of the target and the unreliable acquisition mode on emotion recognition modeling; 2) the present invention constructs an emotion recognition model in the time-space dimension, which makes full use of the continuity of time-space information, represents the causal association of human-object interaction actions in time series, and improves the accuracy of the emotion recognition model; 3) the present invention integrates the semantic-level information of human-object interaction, which further enhances the accuracy of recognition through the emotion recognition model, and the interpretability of modeling based on the human-object interaction.

DETAILED DESCRIPTION OF THE EMBODIMENTS

Figure 1:
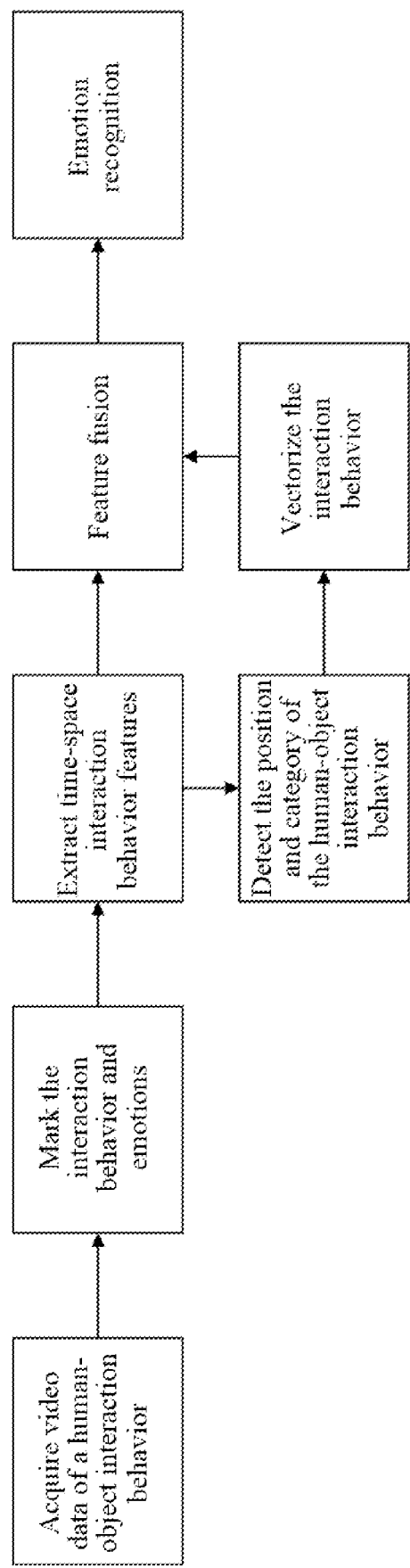
FIG. 1 is a schematic flow diagram of the present invention.

The present invention will be described in detail below with reference to the accompanying drawings and embodiments. This embodiment is implemented on the premise of the technical solution of the present invention. As shown in FIG. 1, a detailed implementation manner and a specific operation process are given, but the protection scope of the present invention is not limited to the following embodiments.

Embodiment 1

A method for emotion recognition based on a human-object time-space interaction behavior, with a residential bedroom as a scene, is implemented, specifically including the following steps:
S1: video data of a human-object interaction behavior process are acquired.

In this embodiment, the scene is a residential bedroom. Interaction behaviors in video data include drinking water in a cup, flipping through books, answering phone calls, operating computers, and pushing/closing doors, etc. Compared with facial or physiological signals as the data source, the human-object interaction behavior as another data source greatly reduces the difficulty of acquiring video data. The face should not be blocked to collect facial signals, and contact sensors are needed to collect physiological signals, while for the human-object interaction behavior, only parts of a person and an object involved in interaction need to be covered, which loosens the restrictions on acquisition of data sources, so that the present invention can be applied to a wider range.

S2: data labeling is performed on the positions of a person and an object and the interaction behaviors and emotions expressed by the person.

Figure 2:
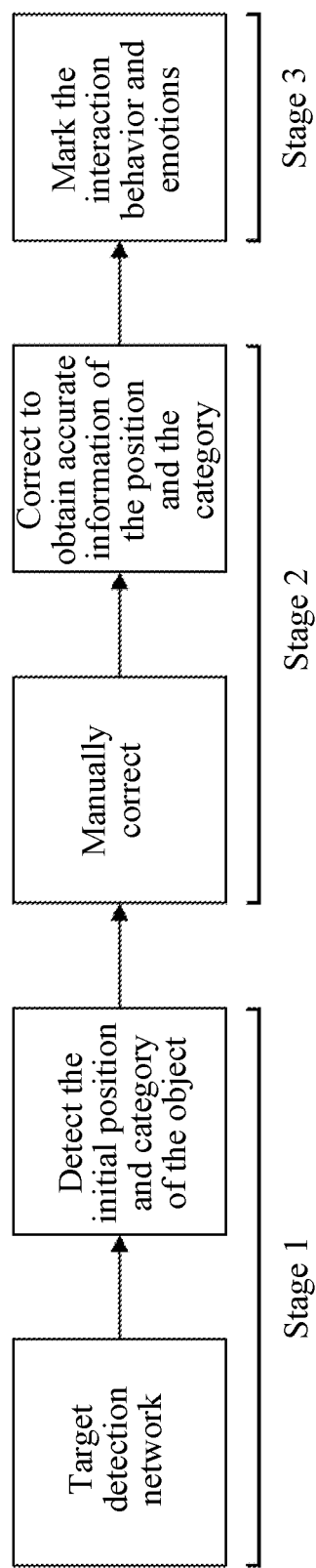
FIG. 2 is a schematic diagram of a data labeling process in an embodiment of the present invention.

In this embodiment, the labeling process is divided into three stages, as shown in FIG. 2. First, the FasterRCNN target detection network is used to generate initial positions of the person and the object and also a category of the object according to all video data acquired. Then, a labeling tool is used to manually correct the initial positions and the category, and also inaccurate initial detection results, to obtain accurate information of the positions and the category. Finally, interaction behavior and emotions are labeled for all acquired video data, where emotions include happiness, frustration, anxiety, anger, surprise, fear, excitement, and neutrality.

S3: a feature extraction model based on deep learning is constructed, features of interaction between the person and the object in a time-space dimension are extracted, and the position and category of the human-object interaction behavior are detected.

In this embodiment, the target detection network based on 3D-DETR is used as the feature extraction model, and the fine-tuning strategy is adopted, that is, network weights of this model pre-trained on a V-COCO dataset are partially reserved, and only the last two layers of the training model are trained on the dataset acquired by this embodiment to extract the behavior features of interaction between the person and the object in a time-space dimension and detect the position and category of the human-object interaction behavior. The fine-tuning strategy improves the training efficiency of the feature extraction model in this embodiment on the human-object interaction behavior dataset. The dimension of interaction behavior features is 2048, and the time length is 20 video frames.

S4: the detected interaction behavior category is mapped into a vector form through a word vector model; and In this embodiment, a Chinese BERT model trained on the Chinese Wikipedia corpus is used as the word vector model, and the detected interaction behavior category is mapped into a vector form. For example, the Chinese phrase "drinking water in a cup" is mapped into a one-dimensional vector. The pre-training task is a whole word masking task, and the vector dimension is 768.

S5: a fusion model based on deep learning is constructed, the interaction behavior vector and the time-space interaction behavior features are fused, and the emotion expressed by the interaction person are identified.

In this embodiment, a multi-modal Transformer model is used as a fusion model to fuse the interaction behavior vector and the time-space interaction behavior features. The fusion interaction behavior vector is used as the Query of the model, and the time-space interaction behavior features are used as Key and Value. Finally, a Softmax classifier composed of a single-layer fully connected layer is constructed to classify the fused features by emotions, and the emotion corresponding to the maximum value of a classifier node is taken as the final emotion recognition result.

Embodiment 2

A method for emotion recognition based on a human-object time-space interaction behavior, with a ticket office as a scene, is implemented, specifically including the following steps:

S1: video data of a human-object interaction behavior process are acquired.

In this embodiment, the scene is the ticket office. Interaction behaviors in video data include drinking water in a cup, flipping through books, answering phone calls, pushing/closing doors, holding queuing railings, etc.

S2: data labeling is performed on the positions of a person and an object and the interaction behaviors and emotions expressed by the person.

In this embodiment, the labeling process is divided into three stages, as shown in FIG. 2. First, the FasterRCNN target detection network is used to generate initial positions of the person and the object and also a category of the object according to all video data acquired. Then, a labeling tool is used to manually correct the initial positions and the category, and also inaccurate initial detection results, to obtain accurate information of the positions and the category. Finally, interaction behavior and emotions are labeled for all acquired video data, where emotions include happiness, frustration, anxiety, anger, surprise, fear, excitement, and neutrality.

S3: a feature extraction model based on deep learning is constructed, features of interaction between the person and the object in a time-space dimension are extracted, and the position and category of the human-object interaction behavior are detected.

In this embodiment, the target detection network based on 3D-DETR is used as the feature extraction model, and the fine-tuning strategy is adopted, that is, network weights of this model pre-trained on a V-COCO dataset are partially reserved, and only the last two layers of the training model are trained on the dataset acquired by this embodiment to extract the behavior features of interaction between the person and the object in a time-space dimension and detect the position and category of the human-object interaction behavior. The fine-tuning strategy improves the training efficiency of the feature extraction model in this embodiment on the human-object interaction behavior dataset. The dimension of interaction behavior features is 2048, and the time length is 20 video frames.

S4: the detected interaction behavior category is mapped into a vector form through a word vector model; and In this embodiment, a Chinese BERT model trained on the Chinese Wikipedia corpus is used as the word vector model, and the detected interaction behavior category is mapped into a vector form. For example, the Chinese phrase "holding queuing railings" is mapped into a one-dimensional vector. The pre-training task is a whole word masking task, and the vector dimension is 768.

S5: a fusion model based on deep learning is constructed, the interaction behavior vector and the time-space interaction behavior features are fused, and the emotion expressed by the interaction person are identified.

In this embodiment, a multi-modal Transformer model is used as a fusion model to fuse the interaction behavior vector and the time-space interaction behavior features. The fusion interaction behavior vector is used as the Query of the model, and the time-space interaction behavior features are used as Key and Value. Finally, a Softmax classifier composed of a single-layer fully connected layer is constructed to classify the fused features by emotions, and the emotion corresponding to the maximum value of a classifier node is taken as the final emotion recognition result.

In addition, it should be noted that the names of the specific embodiments described in this specification may be different, and the above content described in this specification is only an embodiment to illustrate the structure of the present invention. All equivalent minor changes or simple changes made according to the structure, features and principles of the present invention are included in the protection scope of the present invention. Those skilled in the art to which the present invention pertains can make various modifications or additions to the specific embodiments described or adopt similar methods, as long as they do not deviate from the structure of the present invention or go beyond the scope defined by the claims. All should fall within the scope of protection of the present invention.

What is claimed is:

1. A method for emotion recognition based on a human-object time-space interaction behavior, specifically comprising the following steps:
   S1: acquiring video data of a human-object interaction behavior process;
   S2: performing data labeling on positions of a person and an object and interaction behaviors and emotions expressed by the person; wherein the data labeling involves three stages:
   a target detection network is used to generate initial positions of the person and the object in the video data and a category of the object, then the generated initial positions and category are manually corrected and inaccurate detection results are corrected to obtain accurate information of the positions and the category, and finally the interaction behavior and the emotions expressed by the person in the video data are marked;
   S3: constructing a feature extraction model based on deep learning, extracting features of interaction between the person and the object in a time-space dimension, and detecting a location and a category of the human-object interaction behavior;
   S4: mapping the category of the human-object interaction behavior into a vector form through a word vector model; and
   S5: constructing a fusion model based on deep learning, fusing the vector and the features of interaction between the person and the object in the time-space dimension that performs the emotion recognition based on a feature-level and semantic-level fusion to obtain fused vector, and identifying an emotion expressed by the person;

a multi-modal Transformer model is used as a fusion model to fuse the vector and the features of the interaction between the person and the object in the time-space dimension; the vector is used as a Query of the model, and the features of the interaction between the person and the object in the time-space dimension are used as Key and Value; finally, a Softmax classifier composed of a single-layer fully connected layer is constructed to classify features of the fused vector by the emotions, and the emotions corresponding to a maximum value of a classifier node is taken as a final emotion recognition result.

2. The method for emotion recognition based on a human-object time-space interaction behavior according to claim 1, wherein the object in the step S1 is a bedroom, a kitchen, a bathroom, a study room of residential house, a desk of shopping mall or a ticket office.

3. The method for emotion recognition based on a human-object time-space interaction behavior according to claim 1, wherein the interaction behavior in the step S1 refers to using of the object by the person, including drinking water in a cup, flipping through books, answering phone calls, operating TV remotes, operating computers, flipping sheets, brushing teeth, washing face with towels, pushing/closing doors, pushing shopping carts, and holding queuing railings.

4. The method for emotion recognition based on a human-object time-space interaction behavior according to claim 1, wherein a position of the person or the object refers to a smallest rectangular frame parallel to a video image containing the person or the object, and is represented by coordinates of center of rectangle and length and width;

the data labeling of the interaction behavior refers to marking the interaction category and the positions of the corresponding person and object;

the emotions comprise happiness, frustration, anxiety, anger, surprise, fear, excitement, and neutrality; and the neutrality refers to no apparent emotional outpouring.

5. The method for emotion recognition based on a human-object time-space interaction behavior according to claim 1, wherein the feature extraction model in the step S3 uses a target detection network pre-trained on a general dataset, and fine-tunes the acquired video data to detect accurate positions and category of interaction between the person and the object; and the fine-tuning refers to freezing most of learnable parameters of the target detection network based on the pre-trained on the general dataset, and retraining only last two layers of the target detection network in terms of training data.

6. The method for emotion recognition based on a human-object time-space interaction behavior according to claim 1, wherein the time-space dimension in the step S3 refers to a three-dimensional tensor with a fixed time length, comprising one time dimension and two spatial dimensions; and the time length is defined by the number of video frames.

7. The method for emotion recognition based on a human-object time-space interaction behavior according to claim 1, wherein the fused vector in the step S5 refers to the human-object interaction behavior in a form of the vector in the step S4.

8. The method for emotion recognition based on a human-object time-space interaction behavior according to claim 1, wherein identifying the emotions expressed by the person in the step S5 is to classify the features of the fused vector outputted by the fusion model.

* * * * *